(12) United States Patent
Grenier et al.

(10) Patent No.: US 12,176,549 B2
(45) Date of Patent: Dec. 24, 2024

(54) BATTERY COMPRISING AN INTUMESCENT LAYER

(71) Applicant: PPG Industries Ohio, Inc., Cleveland, OH (US)

(72) Inventors: Christophe R. G. Grenier, Pittsburgh, PA (US); Venkateshwarlu Kalsani, Gibsonia, PA (US); Hong Li, Mars, PA (US); Ronnie A. J. Peskens, Haarlem (NL); Calum H. Munro, Gibsonia, PA (US); Shuang Ma, Haarlem (NL); Stuart D. Hellring, Pittsburgh, PA (US); Randy E. Daughenbaugh, Monroeville, PA (US); Arif Mubarok, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 833 days.

(21) Appl. No.: 17/271,029

(22) PCT Filed: Aug. 28, 2019

(86) PCT No.: PCT/US2019/048514
§ 371 (c)(1),
(2) Date: Feb. 24, 2021

(87) PCT Pub. No.: WO2020/047059
PCT Pub. Date: Mar. 5, 2020

(65) Prior Publication Data
US 2021/0218094 A1 Jul. 15, 2021

Related U.S. Application Data

(60) Provisional application No. 62/723,689, filed on Aug. 28, 2018.

(51) Int. Cl.
*C09K 21/14* (2006.01)
*B60K 1/04* (2019.01)
*B62D 25/20* (2006.01)
*H01M 10/0525* (2010.01)
*H01M 50/121* (2021.01)
*H01M 50/143* (2021.01)

(52) U.S. Cl.
CPC ............ *H01M 50/143* (2021.01); *B60K 1/04* (2013.01); *B62D 25/2045* (2013.01); *C09K 21/14* (2013.01); *H01M 10/0525* (2013.01); *H01M 50/121* (2021.01); *B60K 2001/0438* (2013.01); *H01M 2200/10* (2013.01); *H01M 2220/20* (2013.01)

(58) Field of Classification Search
CPC .. H01M 50/143; H01M 50/121; C09K 21/14; B62D 25/20; B60K 1/04
USPC ........................................................ 523/179
See application file for complete search history.

(56) References Cited

U.S. PATENT DOCUMENTS

| | | | |
|---|---|---|---|
| 5,070,119 A | 2/1991 | Nugent, Jr. et al. | |
| 5,108,832 A | 4/1992 | Nugent, Jr. et al. | |
| 9,577,243 B2 | 2/2017 | Schmidt et al. | |
| 9,786,883 B2 | 10/2017 | Nubbe et al. | |
| 9,853,267 B2 | 12/2017 | Page et al. | |
| 2002/0155348 A1 | 10/2002 | Gitto | |
| 2005/0170238 A1 | 8/2005 | Abu-Isa et al. | |
| 2010/0047673 A1 | 2/2010 | Hirakawa et al. | |
| 2010/0087573 A1 | 4/2010 | Cartier et al. | |
| 2011/0070476 A1 | 3/2011 | Takahashi et al. | |
| 2011/0177366 A1 | 7/2011 | Nagasaki et al. | |
| 2013/0164635 A1 | 6/2013 | Schmidt | |
| 2015/0017491 A1 | 1/2015 | Specht et al. | |
| 2015/0221914 A1* | 8/2015 | Page ..................... | H01M 50/35 429/82 |
| 2016/0064710 A1 | 3/2016 | Nubbe et al. | |
| 2016/0152841 A1 | 6/2016 | Butler et al. | |
| 2016/0160059 A1* | 6/2016 | Anderson ............ | C09D 163/00 427/385.5 |
| 2016/0226042 A1 | 8/2016 | Hartmann et al. | |
| 2017/0113080 A1 | 4/2017 | Specht et al. | |
| 2017/0301968 A1 | 10/2017 | Cooney et al. | |
| 2018/0026245 A1 | 1/2018 | Page et al. | |
| 2019/0345346 A1 | 11/2019 | Peskens et al. | |
| 2020/0148898 A1 | 5/2020 | Peskins et al. | |
| 2020/0181429 A1 | 6/2020 | Wu et al. | |

FOREIGN PATENT DOCUMENTS

| | | | |
|---|---|---|---|
| AT | E470245 T1 | 6/2010 | |
| CA | 2255554 A1 | 12/1997 | |
| CA | 2938316 A1 | 8/2015 | |
| CA | 2947765 A1 | 11/2015 | |
| CN | 101945937 A | 1/2011 | |
| CN | 102918684 A | 6/2013 | |
| CN | 203567538 U | 4/2014 | |
| CN | 104205414 A | 12/2014 | |
| CN | 102918684 B | 9/2016 | |
| CN | 106299221 A | 1/2017 | |
| CN | 106519742 A | 3/2017 | |
| CN | 106688107 A | 5/2017 | |
| CN | 106328874 A | 11/2017 | |

(Continued)

*Primary Examiner* — Deve V Hall
(74) *Attorney, Agent, or Firm* — Diane R. Meyers

(57) ABSTRACT

The present invention relates to a battery comprising a crosslinked intumescent layer selected from a coating and a self-supported film or sheet the layer being formed from a curable intumescent composition comprising: (a) a resin component comprising one or more oligomeric or polymeric compounds having a plurality of functional groups; (b) optionally a curing agent having a plurality of functional groups that are reactive with the functional groups of the oligomeric or polymeric compound of resin component (a); and (c) a compound providing an expansion gas upon thermal decomposition; wherein compounds (a) to (c) differ from each other, to an article comprising a battery, wherein the crosslinked intumescent layer is applied to a part of the article adjacent to the battery between the battery and the article, to methods to provide fire protection to a battery or an article comprising a battery or to reduce or prevent thermal runaway of a battery.

13 Claims, 3 Drawing Sheets

(56) References Cited

FOREIGN PATENT DOCUMENTS

| | | |
|---|---|---|
| CN | 107863460 A | 3/2018 |
| CN | 207134404 U | 3/2018 |
| DE | 102012003017 A1 | 8/2013 |
| DE | 102012019674 A1 | 4/2014 |
| DE | 102012019674 B4 | 6/2016 |
| EP | 906639 A2 | 4/1999 |
| EP | 0477840 B1 | 12/1999 |
| EP | 1585181 A1 | 10/2005 |
| EP | 1585181 B1 | 6/2010 |
| EP | 2222777 A1 | 9/2010 |
| EP | 2577779 A1 | 4/2013 |
| EP | 2577779 B1 | 6/2014 |
| EP | 2815445 A1 | 12/2014 |
| EP | 3146574 A1 | 3/2017 |
| EP | 3146581 A1 | 3/2017 |
| EP | 3170215 A1 | 5/2017 |
| GB | 2444364 A | 6/2008 |
| GB | 201521661 A | 12/2015 |
| GB | 201620940 A | 12/2016 |
| GB | 2545214 A | 6/2017 |
| GB | 2546873 A | 8/2017 |
| JP | 2000511343 A | 8/2000 |
| JP | 2003031187 A | 1/2003 |
| JP | 2006261009 A | 9/2006 |
| JP | 2013527579 A | 6/2013 |
| JP | 5856609 B2 | 2/2016 |
| JP | WO2018062172 A1 | 3/2019 |
| KR | 1020100094528 A | 8/2010 |
| KR | 1020130121001 A | 11/2013 |
| KR | 1020160014916 A | 2/2016 |
| KR | 1020170005117 A | 1/2017 |
| KR | 1020170030595 A | 3/2017 |
| KR | 1020170031087 A | 3/2017 |
| KR | 101752329 B1 | 6/2017 |
| TW | 201214836 A | 4/2012 |
| TW | I496333 B | 8/2015 |
| TW | 201607103 A | 2/2016 |
| WO | 9745884 A2 | 12/1997 |
| WO | 9745884 A3 | 12/1997 |
| WO | 2005076387 A2 | 8/2005 |
| WO | 2005076387 A3 | 10/2005 |
| WO | 2006067478 A1 | 6/2006 |
| WO | 2009081381 A1 | 7/2009 |
| WO | 2015113133 A1 | 8/2015 |
| WO | 2015179597 A1 | 11/2015 |
| WO | 2015179625 A1 | 11/2015 |
| WO | 2016010722 A1 | 1/2016 |
| WO | 2016032651 A1 | 3/2016 |
| WO | 2016030865 A1 | 5/2017 |
| WO | 2017097958 A1 | 6/2017 |

* cited by examiner

BATTERY COMPRISING AN INTUMESCENT LAYER

The present invention relates to a battery comprising a crosslinked intumescent layer that is deposited from a curable intumescent composition and to a method to provide fire protection for a battery and/or an article comprising a battery in particular a vehicle comprising a lithium ion battery.

BACKGROUND OF THE INVENTION

Batteries have long been used as mobile power sources. In particular the development of lithium ion batteries has led to an increased power density. As a result, the use of lithium ion batteries has become wide spread in a variety of applications, including consumer electronics particularly mobile phones, tablet and laptop computers, medical devices, industrial equipment, and in particular hybrid/electrical vehicles.

However, many batteries and particularly lithium ion batteries are vulnerable to thermal runaways during which heat and gas are rapidly discharged from a battery and a fire hazard is created. Batteries, especially lithium ion batteries, may comprise electrolyte compositions that contain combustible organic solvents that add to the fire hazard associated with batteries, in particular lithium ion batteries. Furthermore, the batteries used in the above exemplified applications are predominantly battery packs comprising a plurality of individual battery cells. Lithium ion batteries for hybrid or electric vehicles like cars, busses and trucks may contain thousands of individual battery cells. A thermal runaway may be caused by manufacturing defects, accumulation of heat, internal short circuits, or external impacts or trauma. A thermal runaway in one battery cell may affect adjacent battery cells leading to an uncontrollable chain reaction with the result that the entire battery pack may catch fire which in case of vehicles comprising those batteries may spread over the entire vehicle putting the drivers and passengers at risk.

Recent incidents with cell phones or electric cars catching fire due to a thermal runaway of the battery pack make it evident that there is a need to provide better fire protection for batteries, battery cells as well as apparatuses comprising said batteries such as mobile phones, tablet or laptop computers and hybrid or electric vehicles and for their users.

Therefore, it is an object of the present invention to provide batteries wherein in case of a thermal runaway of a battery cell or the entire battery the spread of a fire is prevented or at least inhibited for a prolonged period of time.

It is a further object of the present invention to protect an article comprising a battery and its users from fire hazards associated with the thermal runaway of batteries.

SUMMARY OF THE INVENTION

These and other objects have been attained by a battery comprising a crosslinked intumescent layer selected from a coating and a self-supported film or sheet, the layer being formed from a curable intumescent composition comprising:
  (a) a resin component comprising one or more oligomeric or polymeric compounds having a plurality of functional groups;
  (b) optionally a curing agent having a plurality of functional groups that are reactive with the functional groups of the oligomeric or polymeric compound of resin component (a); and
  (c) a compound providing an expansion gas upon thermal decomposition; wherein compounds (a) to (c) differ from each other.

The present invention further relates to an article comprising a battery wherein a crosslinked intumescent layer according to the present invention is applied to a portion of the article adjacent to the battery between the battery and the article. In particular the article may be a vehicle comprising a lithium ion battery and a passenger cabin and the crosslinked intumescent layer is applied to at least a portion of the floor of the vehicle adjacent to the battery between the battery and the vehicle body.

According to a further aspect, the present invention is directed to the use of the curable intumescent composition as defined according to the present invention to provide fire protection for a battery and/or to reduce or prevent thermal runaway of a battery when applied to any part of the battery.

According to a still further aspect, the present invention is directed to the use of the curable intumescent composition as defined according to the present invention to provide fire protection for an article comprising a battery when applied to a part of the article adjacent to the battery between the battery and the article. In particular, the article may be a vehicle comprising a lithium ion battery and a passenger cabin and the curable intumescent composition is used to protect the passenger cabin of the vehicle from a battery fire.

According to a still further aspect, the present invention is directed to a method to provide fire protection to a battery or to reduce or prevent thermal runaway of a battery by applying the curable intumescent composition as defined according to the present invention to any part of the battery to form a coating thereon and curing the coating to obtain a crosslinked intumescent coating thereon.

According to a still further aspect, the present invention is directed to a method to provide fire protection for a battery or to reduce or prevent thermal runaway of a battery by forming the curable intumescent composition as defined according to the present invention into an intumescent self-supported film or sheet and applying the intumescent self-supported film or sheet to a battery and curing the intumescent self-supported film or sheet prior to or after application to the battery.

According to a still further aspect, the present invention is directed to a method to provide fire protection for an article comprising a battery by applying the curable intumescent composition as defined according to the present invention to a part of the article adjacent to the battery between the battery and the article to form a coating thereon and curing the coating to obtain a crosslinked intumescent coating thereon. In particular the article may be a vehicle comprising a lithium ion battery and a passenger cabin and the crosslinked intumescent coating is positioned to protect the passenger cabin of the vehicle from a battery fire.

According to a still further aspect, the present invention is directed to a method to provide fire protection for an article comprising a battery by forming the curable intumescent composition as defined according to the present invention into an intumescent self-supported film or sheet and applying the intumescent self-supported film or sheet to a part of the article adjacent to the battery between the battery and the article and curing the intumescent self-supported film or sheet prior to or after the application to a part of the article. In particular the article may be a vehicle comprising a lithium ion battery and a passenger cabin and the crosslinked intumescent self-supported film or sheet is positioned to protect the passenger cabin of the vehicle from a battery fire.

According to the present invention, the battery may be a lithium ion battery.

DETAILED DESCRIPTION OF THE INVENTION

Figure 1:
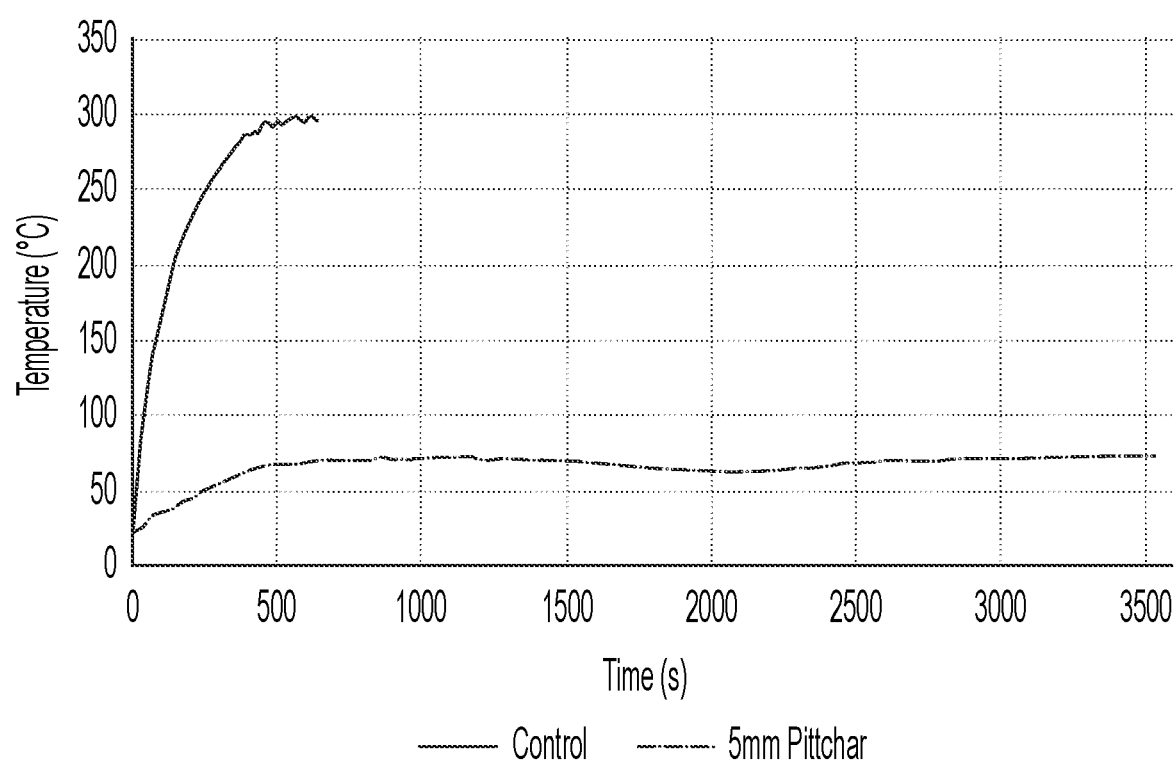
FIG. 1 graphically illustrates the temperature performance for a 5 mm thick sample according to the present invention.

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent. For example, although reference is made to "a" polymer, "a" curing agent", "a" carbon source, "a" foaming agent, "an" acid source, "a" reinforced fiber, "an" inorganic additive, "a" coating composition and the like, one or more of any of these components can be used.

The term "hydrocarbyl" herein refers to a group comprising carbon and hydrogen atoms, wherein one or more of the hydrogen atoms directly bonded with carbon atoms can be replaced, or substituted, by other groups, such as —OH, —SH etc.

The term "long chain hydrocarbon substituent" herein refers to a hydrocarbyl having at least 6 carbon atoms.

The term "battery" as used herein throughout the claims and the specification refers to an individual battery cell as well to a battery pack comprising a plurality of battery cells.

The battery according to the present invention comprises a layer selected from a coating and a self-supported film or sheet, the layer being formed from a curable intumescent composition comprising:

(a) a resin component comprising one or more oligomeric or polymeric compounds having a plurality of functional groups;

(b) optionally a curing agent having a plurality of functional groups that are reactive with the functional groups of the oligomeric or polymeric compound of resin component (a); and (c) a compound providing an expansion gas upon thermal decomposition; wherein compounds (a) to (c) differ from each other.

Resin Component (a)

The oligomeric or polymeric compound bearing a plurality of functional groups used in the present invention is not particularly limited, it includes, but not limited to, epoxy resins, acrylic resins, polysiloxanes, polyurethanes, polyureas, polyvinyls, phenolic resins, urea-formaldehyde resins, polyimides, melamine resins, polyester resins and cyanate resins. Among these resins, epoxy resins, acrylic resins and/or polyurethane resin are particularly suitable.

The functional groups of the resin component (a) may be selected from ketone, hydrazide, carbodiimide, oxazoline, epoxy, amine, vinyl, amide, carbamate, urea, mercaptan, carboxylic acid, (meth)acryloyl, isocyanate, alkoxysilyl, anhydride, hydroxyl, alkoxy groups, functional groups that are capable of reacting with each other and combinations thereof.

Suitable functional groups that are capable of reacting with each other may be selected from N-methylolamide groups; silane groups having silicon bonded hydrolysable or condensable groups, for example chloro, hydroxy, alkoxy, acetoxy and/or ketoximo groups; ethylenically unsaturated fatty acid groups for example capable of oxidative drying by for example air oxygen; azomethine groups; azetidine groups; groups capable of thermally reversible Diels-Alder reaction for example furan/maleimide. If the resin component (a) contains functional groups that are capable of reacting with each other, it is considered self-crosslinking and the presence of a curing agent (b) is not necessary to provide a curable intumescent composition that forms the crosslinked intumescent layer of the present invention.

The resin component (a) may also contain a combination of functional groups that are capable of reacting with each other and functional groups that are reactive with the functional groups of the curing agent (b). In such cases curing agent (b) may be additionally be present to provide in addition to crosslinks between the functional groups that are capable of reacting with each other also crosslinks between the other functional groups and the curing agent (b) upon curing. However, the presence of the curing agent (b) is mandatory if the resin component (a) does not have functional groups that are capable of reacting with each other.

Suitable epoxy resins for the resin component (a) comprise at least one polyepoxide. The polyepoxide has at least two 1,2-epoxy groups. Usually the epoxy equivalent weight of the polyepoxide ranges from 80 to 6000, typically 100 to 700. Epoxy compounds can be saturated or unsaturated, cyclic, aliphatic, alicyclic, aromatic or heterocyclic. They may comprise substituent(s), such as halogen, hydroxy, and ether groups.

The examples of polyepoxides are those having more than 1 or usually about two 1,2-epoxy equivalents; i.e., polyepoxides having two epoxy groups per molecule in average. The most commonly used polyepoxides are, for example, polyglycidyl ether of polyphenols, such as 2,2-bis(4-hydroxyphenyl)propane (bisphenol A), resorcinol, hydroquinone, benzenedimethol, phloroglucinol, bisphenol F, and catechol; or polyglycidyl ether of polyols, such as alicyclic polyols, such as 1,2-cyclohexane diol, 1,4-cyclohexane diol, 2,2-bis(4-hydroxycyclohexyl)propane, 1,1-bis(4-hydroxycyclohexyl)ethane, 2-methyl-1,1-bis(4-hydroxycyclohexyl)propane, 2,2-bis(4-hydroxy-3-tert-butylcyclohexyl)propane, 1,3-bis(hydroxymethyl)cyclohexane and 1,2-bis(hydroxymethyl)cyclohexane. The examples of aliphatic polyols include, in particular, trihydroxymethylpentane diol, ethylene glycol, diethylene glycol, triethylene glycol, 1,2-propylene glycol, 1,4-butyleneglycol, 1,5-pentanediol, 1,2,6-hexanetriol, cyclohexanedimethanol, glycerol, thrimethylolpropane, hydrogenated bisphenol A, hydrogenated bisphenol F or polyether glycols, for example, poly(oxytetramethylene) glycol, poly(oxyethylene) glycol, poly(oxypropylene) glycol and neopentane diol.

A particular suitable polyepoxide has an epoxy equivalent weight of less than 300 g/equivalent. The example includes EPON 828, which is commercially available from Hexion Inc.

Another group of suitable epoxy resins include polyglycidyl ethers of polycarboxylic acids, formed by the reaction of an epoxy compound such as epichlorohydrin with an aliphatic or aromatic polycarboxylic acid such as oxalic acid, succinic acid, glutaric acid, terephthalic acid, 2,6-napthalene dicarboxylic acid, or dimerised linoleic acid.

Other suitable epoxy resins that can be used according to the present invention comprise epoxidized olefinically unsaturated alicyclic materials such as epoxy alicyclic ethers and esters, epoxy resins containing oxyalkylene groups, epoxy novolac resins, which are prepared by reacting an epihalohydrin with the condensation product of an aldehyde with a monohydric or polyhydric phenol such as epoxy phenol novolac resins or epoxy cresol novolac resins.

Furthermore, it can be advantageous according to the present invention to employ a flexible polyepoxide resin as polyepoxy-functional compound (a) of the intumescent composition of the present invention. These resins are generally essentially linear materials, although a small amount of branching is tolerated. Exemplary of suitable materials are epoxidized soybean oil, dimer acid-based materials such as EMPOL 1010 resin, which is commercially available from BASF SE, Ludwigshafen Germany and rubber-modified polyepoxide resins such as the product prepared from a polyglycidyl ether of bisphenol A and an acid-functional polybutadiene.

Other suitable examples of flexible polyepoxides for use according to the present invention include an epoxy-functional adduct which is prepared from a flexible acid-functional polyester and polyepoxide.

The acid-functional polyester generally has an acid value of at least 10 mg KOH/g, generally from about 140 to about 350 mg KOH/g and suitably from about 180 to about 260 mg KOH/g, as determined by ASTM 974-87.

Linear polyesters are more suitable than branched polyesters for use herein. Acid-functional polyesters can be prepared by the polyesterification of an organic polycarboxylic acid or anhydride thereof with an organic polyol. Usually, the polycarboxylic acids and polyols are aliphatic or aromatic dibasic acids and diols.

The diols which are usually employed in making the polyester include alkylene glycols, such as ethylene glycol, diethylene glycol, neopentyl glycol and other diols such as hydrogenated bisphenol A, cyclohexanediol, cyclohexanedimethanol, caprolactonediol, for example, the reaction product of epsilon-caprolactone and ethylene glycol, hydroxyalkylated bisphenols, polyether glycols, for example, poly(oxytetramethylene) glycol, poly(oxyethylene) glycol, poly (oxypropylene) glycol and the like. Polyols of higher functionality can also be used although diols are more suitable. Examples include trimethylolpropane, trimethylolethane, pentaerythritol, glycerol, isosorbide, tetramethyl cyclobutane diol and the like, as well as higher molecular weight polyols such as those produced by oxyalkylating lower molecular weight polyols.

The acid component of the polyester comprises monomeric dicarboxylic acids or anhydrides having 2 to 36 carbon atoms per molecule. Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid, tetrabromomphthalic acid, decanedioic acid, dodecanedioic acid, rosin acids, diphenolic acid, gallic acid, and other dicarboxylic acids of varying types, for example, Diels-Alder adducts of unsaturated $C_{18}$ fatty acids.

The polyester may include minor amounts of monobasic acids such as benzoic acid, stearic acid, acetic acid, hydroxystearic acid and oleic acid. Also, there may be employed higher polycarboxylic acids such as trimellitic acid. Where acids are referred to above, it is understood that anhydrides of those acids which form anhydrides can be used in place of the acid. Also, lower alkyl esters of the acids such as dimethyl glutarate and dimethyl terephthalate can be used.

According to the present invention, the polyester used to make the epoxy-functional adduct may be prepared from a polycarboxylic acid component comprising a polycarboxylic acid or mixture of acids having from 7 to 16 carbon atoms and a polyol component comprising a portion of diethylene glycol.

The polyepoxides that are used to prepare the epoxy-functional adduct of flexible acid-functional polyester and polyepoxide can be selected from those as defined above for the polyepoxide-functional component according to the present invention.

Other suitable polyepoxy-functional compounds are epoxy functional acrylic resins. Such resins can be prepared by free-radical addition polymerization of (meth)acrylic monomers, optionally in combination with vinyl monomers or other monomers comprising at least one carbon-carbon double bond, wherein the monomer composition comprises at least one epoxy functional compound having a one carbon-carbon double bond.

Suitable epoxy-functional ethylenically unsaturated monomers may be selected from glycidyl (meth)acrylate, allyl glycidylether, vinyl glycidylether, vinyl cyclohexene oxide, limonene oxide, 2-ethylglycidylacrylate, 2-ethylglycidylmethacrylate, 2-(n-propyl)glycidylacrylate, 2-(n-propyl)glycidylmethacryl ate, 2-(n-butyl)glycidylacrylate, 2-(n-butyl)glycidylmethacrylate, glycidylmethylmethacrylate, glycidylacrylate, (3',4'-epoxyheptyl)-2-ethylacrylate, (3',4'-epoxyheptyl)-2-ethylmethacrylate, (6',7'-epoxyheptyl)acrylate, (6',7'-epoxyheptyl)methacrylate, allyl-3,4-epoxyheptylether, 6,7-epoxyheptylallylether, vinyl-3,4-epoxyheptylether, 3,4-epoxyheptylvinylether, 6,7-epoxyheptylvinylether, o-vinylbenzylglycidylether, m-vinylbenzylglycidylether, p-vinylbenzylglycidylether, 3-vinyl cyclohexene oxide, alpha-methyl glycidyl methacrylate, 3,4-epoxycyclohexylmethyl (meth)acrylate and combinations thereof. Glycidyl (meth)acrylate is particularly suitable.

Suitable additional monomers for the preparation of the epoxy-functional acrylic resin can be selected from
ethylenically unsaturated nitrile compounds;
vinyl aromatic monomers;
alkyl esters of ethylenically unsaturated acids;
hydroxyalkyl esters of ethylenically unsaturated acids;
amides of ethylenically unsaturated acids;
ethylenically unsaturated acids;
ethylenically unsaturated sulfonic acid monomers and/or ethylenically unsaturated phosphorous-containing acid monomers
vinyl carboxylates;
conjugated dienes;
monomers having at least two ethylenically unsaturated groups; and
combinations thereof.

Examples of ethylenically unsaturated nitrile monomers which can be used for the preparation of the epoxy-functional acrylic resin include polymerizable unsaturated aliphatic nitrile monomers which contain from 2 to 4 carbon atoms in a linear or branched arrangement, which may be substituted either by acetyl or additional nitrile groups. Such nitrile monomers include acrylonitrile, methacrylonitrile, alpha-cyanoethyl acrylonitrile, fumaronitrile and combinations thereof, with acrylonitrile being particularly suitable.

Representatives of vinyl-aromatic monomers include, for example, styrene, α-methyl styrene, p-methyl styrene, t-butyl styrene and vinyltoluene. Suitably, the vinyl-aromatic monomers are selected from styrene, alpha-methyl styrene and combinations thereof.

Esters of (meth)acrylic acid that can be used for the preparation of the epoxy-functional acrylic resin include n-alkyl esters, iso-alkyl esters or tert-alkyl esters of acrylic or (meth)acrylic acid in which the alkyl group has from 1 to 20 carbon atoms, the reaction product of methacrylic acid with glycidyl ester of a neoacid such as versatic acid, neodecanoic acid or pivalic acid and hydroxyalkyl (meth) acrylate and alkoxyalkyl (meth)acrylate monomers.

In general, suitable alkyl esters of (meth)acrylic acids may be selected from $C_1$-$C_{20}$ alkyl (meth)acrylate, suitably $C_1$-$C_{10}$-alkyl (meth)acrylates. Examples of such acrylate monomers include n-butyl acrylate, secondary butyl acrylate, methyl acrylate, ethyl acrylate, hexyl acrylate, tert-butyl acrylate, 2-ethyl-hexyl acrylate, isooctyl acrylate, 4-methyl-2-pentyl acrylate, 2-methylbutyl acrylate, methyl methacrylate, butyl methacrylate, n-butyl methacrylate, isobutyl methacrylate, ethyl methacrylate, isopropyl methacrylate, hexyl methacrylate, cyclohexyl methacrylate and cetyl methacrylate. It is particularly suitable to select the esters of (meth)acrylic acids from methyl (meth)acrylate, ethyl (meth)acrylate, propyl (meth)acrylate, butyl (meth) acrylate, 2-ethylhexyl (meth)acrylate and combinations thereof.

The hydroxy alkyl(meth)acrylate monomers which can be used for the preparation of the epoxy-functional acrylic resin include hydroxyalkyl acrylate and methacrylate monomers which are based on ethylene oxide, propylene oxide and higher alkylene oxides or mixtures thereof. Examples are hydroxyethyl acrylate, hydroxypropyl acrylate, hydroxyethyl methacrylate, hydroxypropyl methacrylate and hydroxybutyl acrylate. Suitably, the hydroxy alkyl(meth) acrylate monomer is selected from 2-hydroxy ethyl (meth) acrylate.

Amides of ethylenically unsaturated acids that can be used for the preparation of the epoxy-functional acrylic resin include acrylamide, methacrylamide, and diacetone acrylamide. A particularly suitable amide monomer is (meth) acrylamide.

Vinyl ester monomers which can be used to prepare the epoxy-functional acrylic resin include vinyl acetate, vinyl proprionate, vinyl butyrate, vinyl benzoate, vinyl-2-ethylhexanoate, vinyl stearate, and the vinyl esters of versatic acid. The particularly suitable vinyl ester is vinyl acetate.

The ethylenically unsaturated carboxylic acid monomers suitable for the preparation of the epoxy-functional acrylic resin include monocarboxylic acid and dicarboxylic acid monomers and monoesters of dicarboxylic acid. Carrying out the present invention, it is particularly suitable to use ethylenically unsaturated aliphatic mono- or dicarboxylic acids or anhydrides which contain from 3 to 5 carbon atoms. Examples of monocarboxylic acid monomers include acrylic acid, methacrylic acid, crotonic acid and examples of dicarboxylic acid monomers include fumaric acid, itaconic acid, maleic acid and maleic anhydride. Examples of other suitable ethylenically unsaturated acids include vinyl acetic acid, vinyl lactic acid, vinyl sulfonic acid, 2-methyl-2-propene-1-sulfonic acid, styrene sulfonic acid, acrylamidomethyl propane sulfonic acid and the salts thereof. Suitably, the ethylenically unsaturated carboxylic acid monomers are selected from (meth)acrylic acid, crotonic acid, itaconic acid, maleic acid, fumaric acid and combinations thereof.

Conjugated diene monomers suitable for the preparation of the epoxy-functional acrylic resin include conjugated diene monomers, selected from 1,3-butadiene, isoprene, 2,3-dimethyl-1,3-butadiene, 2,3-dimethyl-1,3-butadiene, 2-chloro-1,3-butadiene, 1,3-pentadiene, 1,3-hexadiene, 2,4-hexadiene, 1,3-octadiene, 2-methyl-1,3-pentadiene, 2,3-dimethyl-1,3-pentadiene, 3,4-dimethyl-1,3-hexadiene, 2,3-diethyl-1,3-butadiene, 4,5-diethyl-1,3-octadiene, 3-butyl-1,3-octadiene, 3,7-dimethyl-1,3,6-octatriene, 2-methyl-6-methylene-1,7-octadiene, 7-methyl-3-methylene-1,6-octadiene, 1,3,7-octatriene, 2-ethyl-1,3-butadiene, 2-amyl-1,3-butadiene, 3,7-dimethyl-1,3,7-octatriene, 3,7-dimethyl-1,3,6-octatriene, 3,7,11-trimethyl-1,3,6,10-dodecatetraene, 7,11-dimethyl-3-methylene-1,6,10-dodecatriene, 2,6-dimethyl-2,4,6-octatriene, 2-phenyl-1,3-butadiene and 2-methyl-3-isopropyl-1,3-butadiene and 1,3-cyclohexadiene. 1,3-Butadiene, isoprene and combinations thereof are particularly suitable conjugated dienes.

It is also possible to use a combination of two or more, such as three or more or four or more, different polyepoxy-functional compounds in resin component (a) that may be selected from those as disclosed above.

Suitable polyepoxy-functional compounds according to the present invention may be selected from diglycidyl ether of bisphenol A, diglycidyl ether of bisphenol F, resorcinol diglycidyl ether, epoxy phenol novolac resin, epoxy cresol novolac resins, epoxy functional (poly)siloxanes, epoxy functional polysilfides, epoxy-functional adducts of acid-functional polyesters and polyepoxides, for example, those that are described above.

The acrylic resins used in the present invention include copolymers of one or more alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and such as 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and 4-methacrylonitrile; vinyl and vinylidene halides such as vinyl chloride and vinylidene fluoride and vinyl esters such as vinyl acetate.

The acrylic copolymers can include hydroxyl-functional groups, which are often incorporated into the polymer by including one or more hydroxyl-functional monomers in the reactants used to produce the copolymer. Useful hydroxyl-functional monomers include hydroxyalkyl acrylates and methacrylates, typically having 2 to 4 carbon atoms in the hydroxyalkyl group, such as hydroxyethyl acrylate, hydroxypropyl acrylate, 4-hydroxybutyl acrylate, hydroxy-functional adducts of caprolactone and hydroxyalkyl acrylates, and corresponding methacrylates, as well as the beta-hydroxy ester-functional monomers described below. The acrylic polymer can also be prepared with N-(alkoxymethyl) acrylamides and N-(alkoxymethyl) methacrylamides.

Beta-hydroxy ester-functional monomers can be prepared from ethylenically unsaturated, epoxy-functional monomers and carboxylic acids having from 5 to 20 carbon atoms, or from ethylenically unsaturated acid-functional monomers and epoxy compounds containing at least 5 carbon atoms which are not polymerizable with the ethylenically unsaturated acid functional monomer.

The polymer used in the present invention can also be a polyurethane. Among the polyurethanes which can be used are polymeric polyols which are prepared by reacting polyester polyols or acrylic polyols such as those mentioned above with a polyisocyanate such that the OH/NCO equivalent ratio is greater than 1:1 so that free hydroxyl groups are present in the product.

Additional examples of polyurethane polymers suitable for forming the active hydrogen-containing, cationic polymer include the polyurethane, polyurea, and poly(urethane-urea) polymers prepared by reacting polyether polyols and/or polyether polyamines with polyisocyanates. Such polyurethane polymers are described in U.S. Pat. No. 6,248,225.

According to the present invention, for resin component (a) also a plurality of oligomeric or polymeric compounds bearing a plurality of functional groups of different chemistry can be used, including combinations of epoxy resins and acrylic resins or epoxy resins and polyurethane resins, as for example disclosed in U.S. Pat. No. 5,108,832 or 5,070,119.

In case the resin component (a) comprises an epoxy resin and a polyamine and/or a polythiol-functional compound is used as curing agent, as will be discussed below, the resin component (a) may further comprise
(i) a beta-hydroxy ester of (meth)acrylic acid;
(ii) a (meth)acrylate-functional compound different from compound (i); or a combination thereof.

The beta-hydroxy ester of (meth)acrylic acid may comprise a plurality of beta-hydroxy ester of (meth)acrylic ester groups resulting from the reaction of a polyepoxide with (meth)acrylic acid. The polyepoxide can be reacted with the (meth)acrylic acid in an epoxy-carboxylic acid equivalent ratio of 1:0.1 to 1:1.2, suitably 1:0.5 to 1:1.2 more suitably 1:1 to 1:1.05.

The polyepoxides that can be used for the reaction product of polyepoxide with (meth)acrylic acid can be selected from those polyepoxides as disclosed above with respect to component (a) of the intumescent composition of the present invention. Particularly suitable epoxides that can be used for making the beta-hydroxy ester of (meth)acrylic acid (component (b) of the intumescent composition according to the present invention are selected from diglycidyl ether of bisphenol A, diglycidyl ether of bisphenol F, epoxy phenyl novolac resins, epoxy cresol novolac resins, epoxy-functional acrylic resins, epoxy-functional polyester or combinations thereof.

A particularly suitable beta-hydroxy ester of (meth) acrylic acid is the reaction product of EPIKOTE 828 (reaction product of bisphenol A with epichlorohydrin) with acrylic acid, commercially available from Allnex as EBECRYL 3720).

In addition, or alternatively to the beta-hydroxy ester of (meth)acrylic acid (i), a (meth)acrylate-functional compound (ii) different from compound (i) may be present in resin component (a). Thereby, the viscosity of the intumescent composition of the present invention can be suitably adjusted. Thus, it is believed that the optional component (ii) functions as a reactive diluent in the intumescent composition of the present invention. The optional (meth)acrylate-functional component (ii) of the intumescent composition of the present invention may be selected from poly(meth) acrylates of 1,4-butanediol, neopentyl glycol, ethylene glycol, 1,2-propanediol, 1,3-propanediol, 2,2,4-trimethyl-1,3-pentanediol, 1,6-hexanediol, 1,4-cyclohexane dimethanol, para-xylene glycol, 1,4-cyclohexane diol, trimethylolethane, trimethylolpropane, pentaerythritol, polyether glycols, for example, poly(oxytetramethylene) glycol, poly(oxyethylene) glycol, poly(oxypropylene) glycol and combinations thereof.

The present inventors found out that the addition of the beta-hydroxy ester of (meth)acrylic acid (i) and/or the (meth)acrylate-functional compound (ii) different therefrom results in a considerable increase of curing rate of the composition.

Without wanting to be bound by theory, it is believed that this increase in curing rate is due to the Michael addition reaction between the acrylic group of the beta-hydroxy ester of (meth)acrylic acid (i) or the (meth)acrylate-functional compound (ii) different therefrom and the polyamine and/or the polythiol-functional compound.

In the intumescent composition of the present invention the epoxy resin may be present in an amount of 20 to 95 wt.-%, suitably 40 to 95 wt.-%, and the beta-hydroxy ester of (meth)acrylic acid (i) may be present in an amount of 5 to 80 wt.-%, suitably 5 to 60 wt.-%, whereby the weight percentage is based on the total weight of epoxy resin and beta-hydroxy ester(s) of (meth)acrylic acid (i).

Furthermore, in the intumescent composition of the present invention, the epoxy resin (a) may be present in an amount of 25 to 95 wt.-%, suitably 40 to 95 wt.-%, the beta-hydroxy ester of (meth)acrylic acid (i) may be present in an amount of 5 to 75 wt.-%, suitably 5 to 60 wt.-%, and the (meth)acrylate-functional compound (ii), different from compound (i), may be present in an amount 0 to 50 wt.-%, suitably 5 to 30 wt.-%, wherein the weight percentages are based on the total weight of compounds (a), (i) and (ii).

In the intumescent composition of the present invention, the amount of the resin component (a) may be 10-40 wt.-%, based on the total solid weight of the intumescent composition, such as 15-38 wt.-%, 22-36 wt.-%, or 23-30 wt.-%. Alternatively, the amount of the polymer in the composition of the present invention may be 10, 11, 12, 13, 14, 15, 16, 17, 18, 19 wt.-% to 30, 31, 32, 33, 34, 35, 36, 37, 38, 39, 40 wt.-%. The endpoints of the above ranges can be arbitrarily combined to define the amount of the polymer in the intumescent composition of the present invention.

Curing Agent (b)

There is no particular limit to the curing agent used in the curable intumescent composition according to the present invention, as long as it can react with the functional groups of the oligomeric or polymeric compound of resin component (a) and cure it. Suitable curing agents include polyamines, for example polyetheramines, polyamides, polyepoxides, aminoplast resins, phenolic resins, polyisocyanates, polythiols, and polyols, etc. Curing can take place either at ambient temperature or upon application of heat.

The curing agent may also be a latent or blocked curing agent, wherein the actual functional group that is reactive with the functional groups of the resin component (a) is generated or restored in a deblocking reaction at curing conditions such as elevated temperatures. Suitable curing agents of said type are for example blocked polyisocyanates. Thus, the term polyisocyanate as used herein encompasses blocked and free polyisocyanates. Latent or blocked curing agents are particularly suitable to provide single component compositions to secure sufficient storage stability and pot life prior to application and curing.

The polyamine curing agent can be selected from aliphatic polyamines, aromatic polyamines, polyamine amides, polyetheramines, for example those commercially available from Huntsman Cooperation, The Woodlands, Tex., polysiloxane amines, polysulfide amines or combinations thereof. Examples include diethylene triamine, 3,3-amino-bis-propyl amine, triethylene tetraamine, tetraethylene pentamine, m-xylylenediamine, isophorone diamine, 1,3-bis(aminoethyl)cyclohexane, bis(4-aminocyclohexyl)methane, N-aminoethyl piperazine, 4,4'-diaminodiphenyl methane, 4,4'-diamino-3,3'-diethyl diphenyl methane and diamino diphenyl sulphone and the reaction product of a polyamine and an aliphatic fatty acid such as the series of materials sold by BASF under the trademark VERSAMID can be used, the latter being particularly suitable.

In addition, adducts of any above polyamines can also be used. The adduct of polyamine is formed by reacting polyamine with a suitable reactive compound, such as an epoxy resin. This reaction will decrease the content of free amine in the curing agent, making it more useful at low temperature and/or high humidity environment.

As a curing agent, various polyetheramines, such as various Jeffamines available from Huntsman Corp., including, but not limited to, Jeffamine D-230, Jeffamine D-400, Jeffamine 600, Jeffamine 1000, Jeffamine 2005 and Jeffamine 2070, etc, can also be used.

As a curing agent, various polyamides can also be used. Generally, polyamides contain reaction products of dimer fatty acid and polyethyleneamine, and small amounts of monomer fatty acid. Dimer fatty acid is prepared by the oligomerization of monomer fatty acid. Polyethyleneamine can be any higher polyethyleneamine, such as diethylenetriamine, triethylenetetraamine, tetraethylenepentaamine, etc., wherein the most commonly used is diethylenetriamine. When polyamides are used as the curing agent, it can make the layer have a good balance between corrosion resistance and waterproof property. Further, polyamides can also make the layer have good flexibility, proper curing rate and other advantageous factors.

The polythiol compounds may be selected from polysulfide thiols, polyether thiols, polyester thiols, pentaerythritol based thiols; or combinations thereof. A particularly suitable polythiol compound is Thioplast© G4, commercially available from Akzo Nobel Functional Chemicals GmbH&Co KG, Greiz, Germany.

As mentioned above, if the resin component (a) comprises an epoxy resin a polyamine, a polythiol compound or a combination thereof may be used as curing agent (b).

In the intumescent composition of the present invention, the equivalent ratio of the combined functional groups such as epoxy groups and (meth)acrylate groups in component (a) to the functional groups in component (b) may be from 2:1 to 1:2, suitably from 1.05:1.0 to 1:2, particularly suitable from 1:1.4 to 1:2.

In the intumescent composition of the present invention, the amount of the curing agent (b) is typically 10-30 wt.-%, based on the total solids weight of the intumescent composition, such as 15-20 wt.-%, 16-19 wt.-%, or 17-19 wt.-%. Alternatively, the amount of the curing agent in the composition of the present invention may be 10, 11, 12, 13, 14 or 15 wt.-% to 18, 19, 20, 21, 22, 23, 24 or 25 wt.-%. The endpoints of the above ranges can be arbitrarily combined to define the amounts of various curing agents in the intumescent composition of the present invention.

The intumescent composition of the present invention can also comprise a curing promoter. A curing promoter is a kind of material which can accelerate the curing of the resins, lower the curing temperature, shorten the curing time. Typical curing promoters include aliphatic amine promoters, such as triethanolamine, triethylenediamine, etc.; anhydride promoters, such as BDMA, DBU, etc.; polyetheramine catalysts; tin promoters, such as dibutyltin dilaurate, stannous octoate, etc. In one embodiment of the present invention, the curing promoter is ANCAMINE K54, which is commercially available from Air Products.

Suitable amounts of curing promoters are 0.1 to 5 wt.-%, more suitably 1 to 3 wt.-% based on the total solids weight of the intumescent composition.

Compound Providing an Expansion Gas Upon Thermal Decomposition (c)

The intumescent composition of the present invention further comprises, as component (c), a compound providing an expansion gas upon thermal decomposition.

The expansion gas serves to cause the fire-protective intumescent composition to foam and swell when exposed to high temperature of flames. As a result of this expansion, the char which is formed is a thick, multicelled material which serves to insulate and protect the underlying substrate. The source of expansion gas that may be used in the intumescent composition of the present invention is a nitrogen-containing material. Examples of suitable nitrogen-containing materials include melamine, salts of phosphoric acid, guanidine, methylolated melamine, hexamethoxymethyl melamine, urea, dimethylurea, melamine pyrophosphate, dicyandiamide, guanylurea phosphate and glycine. Suitably, melamine is used. Other conventional sources of expansion gas can also be used such as those materials which liberate carbon dioxide. Examples are alkaline earth metals such as calcium carbonate or magnesium carbonate. Compounds which release water vapor as they decompose upon heating, for example calcium hydroxide, magnesium dihydroxide or aluminum trihydroxide, may also be used. Other examples of such compounds are boric acid and boric acid derivatives such as boric acid esters and metal borates.

A suitable amount of component (c) in the intumescent composition of the present invention may range from 0.1 to 25 wt.-%, suitably 1 to 10 wt.-%, whereby the weight percentage is based on the total solids weight of the composition.

The intumescent composition of the present invention may comprise optional additives that are selected from a phosphorous source, a boron source, a zinc source, an acid source, a metal oxide, for example pre-hydrolysed tetraethylorthosilicate, aluminum oxide, titanium isopropoxide, a carbon source, inorganic fillers, mineral fibers, for example CHOPVANTAGE from PPG, Coatforce or Roxul fibers from Lapinus, rheology additives, organic solvents, pigments, foam stabilizers, and combinations thereof.

The optional source of phosphorous can be selected from a variety of materials, such as, for example, phosphoric acid, mono- and diammonium phosphate, tris-(2-chloroethyl) phosphate, phosphorus-containing amides such as phosphorylamide, and melamine pyrophosphate. Suitably, the source of phosphorous is an ammonium polyphosphate represented by the formula $(NH_4)_{n+2}P_nO_{3n+1}$, wherein n is an integer of at least 2, suitably n is an integer of at least 50. The intumescent composition of the present invention may contain an amount of phosphorous in the range of 0.05 to 30 wt.-%, suitably 0.5 to 10 wt.-%, based on the total solid weight of the composition. The phosphorous is believed to function as a char promoter in the intumescent composition.

The optional source of zinc can be selected from a variety of materials. It is believed that the zinc material contributes to the formation of a small-celled structure in the char. The small cells of the char afford better insulation of the substrate and are better able to retain the char's integrity and adhere to the substrate even in the absence of external reinforcing materials. Thus, cracking of the char and its breaking away from the substrate are minimized and a greater measure of protection is afforded to the underlying steel. Examples of suitable materials which are sources of zinc include zinc oxide, zinc salts, such as zinc borate and zinc phosphate, zinc carbonate; also zinc metal can be used. Suitably, zinc borate is utilized. The intumescent composition of the present invention may contain an amount of zinc in the range from 0.1 to 25 wt.-%, suitably 0.5 to 12 wt.-%, based on the total solids weight of the composition.

The source of boron may be selected from ammonium pentaborate or zinc borate, boron oxide, borates such as sodium borate, potassium borate and ammonium borate, borate esters such as butyl borates or phenyl borates and combinations thereof. The intumescent composition of the present invention may contain an amount of boron in the range from 0.1 to 10 wt.-%, suitably 1 to 6 wt.-%, whereby the weight percentage is based on the total solids weight of the composition.

The acid source may be selected from ammonium phosphate, ammonium polyphosphate, diammonium diphosphate, diammonium pentaborate, phosphoric acid-generating materials, boric acid, metal or organic borates and combinations thereof. The total amount of acid source, if present, may be 5 to 30 wt.-%, based on the total solids weight of the composition.

The intumescent composition of the present invention further comprises a carbon source. The carbon source transforms into char upon exposure to fire or heat, thereby forming an anti-fire protective layer on the substrate. According to the present invention, carbon sources can be, for example, aromatic compounds and/or tall oil fatty acids (TOFA) and/or polyhydroxy compounds such as pentaerythritol, dipentaerythritol, glycerol, oligomeric glycerol, xylitol, mannitol, sorbitol and polymers such as polyamides, polycarbonates, polyurethanes, and combinations thereof. The inventors of the present invention have surprisingly found that when carbon sources including aromatic compounds and/or tall oil fatty acids are used as the carbon source in intumescent coating composition of the present invention, the resultant intumescent layer will not only have comparable or even better anti-fire properties than the similar type of intumescent layers but can also maintain these required properties after undergone low temperatures. It will also be appreciated that the polymer may also be a carbon source.

In the intumescent composition of the present invention, the amount of the carbon source can be up to 18 wt.-%, based on the total weight of the intumescent composition, such as 5-18 wt.-%, 11-17 wt.-%, or 12-16 wt.-%. Alternatively, the amount of the carbon source in the composition of the present invention can be 5, 6, 7, 8, 9, 10, 11, 12, 13 wt.-% to 15, 16, 17, 18 wt.-%. The endpoints of the above ranges can be arbitrarily combined to define the amounts of various carbon sources in the intumescent composition of the present invention.

It should be understood that the phosphorus, zinc, boron and expansion gas can each be provided by a separate source material or, alternatively, a single material may be a source of more than one of the aforelisted additional components. For example, melamine pyrophosphate can provide a source of both phosphorus and expansion gas.

The optional reinforcing fillers may be chosen from among a large array of conventionally utilized materials, including fibrous reinforcements and platelet reinforcements, which are suitable over other fillers. Examples of fibrous reinforcements include glass fibers, ceramic fibers, e.g., aluminum oxide/silicon oxide, and graphite fibers. Platelet reinforcements include hammer-mill glass flakes, mica, and wollastonite. Other suitable fillers include metal oxides, titanium oxides, clay, talc, silica, diatomaceous earth, Lapinus® fibers and various pigments. The reinforcing filler is believed to assist in controlling expansion of the fire-protective composition prior to and during char formation so that the resultant char is hard and uniform. When present, the reinforcing filler is usually present in the composition in an amount ranging from 1 to 50 wt.-%, based on the total solids weight of the intumescent composition.

The intumescent composition of the present invention may also contain a variety of conventional additives, such as rheology additives, organic solvents, foam stabilizers, pigments, flame spread control agents, and the like. These ingredients are optional and can be added in varying amounts.

As mentioned above the crosslinked intumescent layer expands at a temperature above the activation temperature to induce thermal decomposition of compound (c) and optionally is charred. Upon the action of heat and fire, the expanded foam starts to char, wherein the resin material and optionally present additional carbon sources form a porous carbon network that exhibits stability at high temperatures and provides for thermal insulation in order to prevent or at least inhibit for a prolonged period of time a thermal runaway of the battery or individual battery cells.

The intumescent composition may be configured as two-package system, with the resin component (a) in a first package (A) and the component (b) in a second package (B), whereby the compound providing an expansion gas upon thermal decomposition (c) and any of the additives (d), if present, are comprised in any combination in either package (A) or package (B) or in both or are comprised in one or more further packages (C). The individual packages are mixed prior to use of the intumescent composition.

The curable intumescent composition of the present invention, when it is prepared, is usually in the form of a thick material such as a mastic. It is particularly suitable that the composition be solvent-free and spray-applied. If desired, thinning can be accomplished with a variety of conventional solvents such as, xylene, methylene chloride or 1,1,1-trichloroethane.

The curable intumescent coating composition of the present invention may be applied to provide the various dry coating thicknesses as desired. Suitable dry coating thicknesses can range from 10-20,000 microns, such as 50-5000 microns, such as 100-2000 microns.

Alternatively, the curable intumescent composition of the present invention can be formed into a self-supported film or sheet. The self-supported film or sheet is subsequently cured to form a crosslinked intumescent self-supported film or sheet. In general, the curable intumescent composition of the present invention can be formed into a film or sheet by any technique well known to a person skilled in the art, for example a cast molding process. The film or sheet can be cured to form a crosslinked intumescent self-supported film or sheet prior to the application of the crosslinked intumescent self-supported film or sheet to a substrate. It is also within the ambit of the present invention that after the forming step the uncured film or sheet is applied to a substrate and then subsequently cured to obtain the crosslinked intumescent layer according to the present invention. This technology is not limited to provide fire protection for a battery or an article comprising a battery but is applicable to any substrate to be fire protected The curable intumescent coating composition of the present invention or the crosslinked intumescent self-supported film or sheet can be applied to any structural element of a battery, in particular lithium ion battery, to obtain a battery according to the present invention. The battery may comprise exterior wall elements defining a housing and optionally interior wall elements, wherein the crosslinked intumescent coating or the crosslinked intumescent self-supported film or sheet is at least partially applied to the external and/or internal side of any of the exterior wall elements and/or to any side of any of the interior wall elements, if present. The exterior wall and/or interior wall elements may comprise a material selected from any of composite, steel, aluminum and polycarbonate.

The battery, in particular lithium ion battery, may be a battery pack comprising a plurality of individual battery cells, wherein the crosslinked intumescent coating or the crosslinked intumescent self-supported film or sheet is positioned to thermally insulate at least some of the individual battery cells from each other in the expanded and optionally charred state. In addition, the curable intumescent coating composition or the crosslinked intumescent self-supported film or sheet may be applied to the housing walls and interior dividing walls of the battery pack as discussed above.

In order to provide fire protection for articles comprising a battery and their users it is also within the ambit of the present invention to apply the curable intumescent coating composition or the crosslinked intumescent self-supported film or sheet to a part of an article adjacent to the battery between the battery and the article to insulate the article from the battery. In such cases a conventional battery or a battery according to the present invention can be employed. The article may be, for example, a mobile phone, a tablet or a laptop computer.

Alternatively, the article may be a vehicle such as a hybrid or electric car, bus or truck. In such vehicles it is common to position the battery, especially the lithium ion battery, due to its weight as a flat battery pack underneath the floor portion of the vehicle body, for example the car body. In such cases, the curable intumescent coating of the present invention or the crosslinked intumescent self-supported film or sheet may be applied to the floor portion of the vehicle adjacent to the battery between battery and the vehicle body. Thereby, in an event of a thermal runaway of the battery or a battery fire, the car body, especially the passenger cabin, is protected by the crosslinked intumescent layer so that the fire will not spread into the passenger cabin and the heat-up of the passenger cabin will be limited for a prolonged period of time so that the passengers will have sufficient time to safely escape from the vehicle in case of such an incident.

The present invention is further described by the following aspects:

Aspect 1. A battery comprising a crosslinked intumescent layer selected from a coating and a self-supported film or sheet, the layer being formed from a curable intumescent composition comprising:
(a) a resin component comprising one or more oligomeric or polymeric compounds having a plurality of functional groups;
(b) optionally a curing agent having a plurality of functional groups that are reactive with the functional groups of the oligomeric or polymeric compound of resin component (a); and
(c) a compound providing an expansion gas upon thermal decomposition;
wherein compounds (a) to (c) differ from each other.

Aspect 2. The battery of aspect 1, wherein the resin component (a) comprises one or more epoxy resins, polysiloxane resin, acrylic resins, polyurethane resins, polyurea resins, polyvinyl resins, phenolic resins, urea formaldehyde resins, polyimide resins, melamine resins, polyester resins and cyanate resins.

Aspect 3. The battery of any of aspects 1 or 2, wherein the functional groups of the resin component (a) are selected from epoxy, amine, vinyl, amide, carbamate, urea, mercaptan, carboxylic acid, (meth)acryloyl, isocyanate, alkoxysilyl, anhydride, hydroxyl, alkoxy groups, functional groups that are capable of reacting with each other and combinations thereof.

Aspect 4. The battery of aspect 3, wherein the functional groups that are capable of reacting with each other are selected from N-methylolamide groups; silane groups having silicon bonded hydrolysable or condensable groups; ethylenically unsaturated fatty acid groups; azomethine groups; azetidine groups; groups capable of thermally reversible Diels-Alder reaction.

Aspect 5. The battery of any of the preceding aspects, wherein the presence of the curing agent (b) is mandatory if the resin component (a) does not have functional groups that are capable of reacting with each other.

Aspect 6. The battery of any of the preceding aspects, wherein the curing agent (b) comprises one or more of polyamines, polyamides, polyols, polythiols, aminoplast resins, phenolic resins, polyisocyanates and polyepoxides, Aspect 7. The battery of any of the preceding aspects, wherein the resin compound (a) comprises an epoxy resin and the curing agent (b) is mandatory and comprises
a polyamine-functional compound that may be selected from an aliphatic polyamine, an aromatic polyamine, poly(amine-amides) polyetheramines and combinations thereof or
a polythiol-functional compound that may be selected from polysulfide thiols, polyether thiols, polyester thiols, pentaerythritol based thiols and combinations thereof or
combinations thereof.

Aspect 8. The battery of any of aspects 2-7, wherein the epoxy resin is selected from diglycidyl ether of bisphenol A, diglycidyl ether of bisphenol F, an epoxy phenol novolac resin, an epoxy cresol novolac resin, epoxy-functional acrylic resins, epoxy-functional polyester or combinations thereof.

Aspect 9. The battery of any of the preceding aspects, wherein the compound providing an expansion gas upon thermal decomposition (c) is selected from melamine, ammonium salts of phosphoric acid, guanidine, methylolated melamine, hexamethoxymethyl melamine, urea, dimethylurea, melamine pyrophosphate, dicyandiamide, guanylurea phosphate, glycine, calcium carbonate, magnesium carbonate, calcium hydroxide, magnesium dihydroxide, aluminum trihydroxide, boric acid and boric acid esters.

Aspect 10. The battery of any of the preceding aspects, further comprising additives (d) selected from a phosphorous source, a boron source, a zinc source, an acid source, a carbon source, reinforcing fillers, rheology additives, organic solvents, pigments, foam stabilizers, adhesion promoters, corrosion inhibitors, UV stabilizers and combinations thereof.

Aspect 11. The battery of aspect 10, wherein the further additives comprise a combination of a phosphorous source, a boron source, a zinc source, an acid source and optionally a carbon source, whereby a single material may be a source of two or more of the defined elements.

Aspect 12. The battery of any of aspects 7-11, wherein the resin component (a) further comprises
(i) a beta-hydroxy ester of (meth)acrylic acid;
(ii) a (meth)acrylate-functional compound different from compound (i); or a combination thereof.

Aspect 13. The battery of aspect 12, wherein the beta-hydroxy ester of (meth)acrylic acid (i) comprises a plurality of beta-hydroxy (meth)acrylic ester groups, resulting from the reaction of a polyepoxide with (meth)acrylic acid, wherein the polyepoxide may be selected from diglycidyl ether of bisphenol A, diglycidyl ether of bisphenol F, an epoxy phenol novolac resin, an epoxy cresol novolac resin, epoxy functional acrylic resins, epoxy functional polyester or combinations thereof.

Aspect 14. The battery of aspect 13, wherein the beta-hydroxy ester of (meth)acrylic acid (i) comprises the product of the reaction of a polyepoxide with (meth)acrylic acid in an epoxy carboxylic acid equivalent ratio of 1:0.1 to 1:1.015.

Aspect 15. The battery of any of aspects 12 to 14, wherein the (meth)acrylate-functional compound (ii) is selected from poly(meth)acrylates of 1,4-butanediol, neopentyl glycol, ethylene glycol, 1,2-propanediol, 1,3-propanediol, 2,2,4-trimethyl-1,3-pentanediol, 1,6-hexanediol, 1,4-cyclohexane dimethanol, para-xylene glycol, 1,4-cyclohexane diol, trimethylolethane, trimethylolpropane, pentaerythritol and combinations thereof.

Aspect 16. The battery of any of the preceding aspects, wherein
the total amount of resin component (a) is 10 to 40 wt.-%, based on the total solids weight of the composition;
the total amount of curing agent (b) is 10 to 30 wt.-%, based on the total solids weight of the composition;
the total weight of the compound providing an expansion gas upon thermal decomposition (c) is 0.1 to 25 wt.-% based on the total solids weight of the composition;
the total amount of phosphorous source, if present, is 0.05 to 20 wt.-%, based on the total solid weight of the composition;
the total amount of zinc source, if present, is 0.1 to 25 wt.-%, based on the total solid weight of the composition;
the total amount of boron source, if present, is 0.1 to 10 wt.-%, based on the total solid weight of the composition;
the total amount of acid source, if present, is 5 to 30 wt.-%, based on the total solids weight of the composition.

Aspect 17. The battery of any of the preceding aspects, wherein the crosslinked intumescent layer when exposed to a temperature above the activation temperature to induce thermal decomposition of compound (c) expands and optionally is charred.

Aspect 18. The battery of any of the preceding aspects further comprising exterior wall elements defining a housing and optionally interior wall elements, wherein the crosslinked intumescent layer is at least partially applied to the external and/or internal side of any of the exterior wall elements and/or to any side of any of the interior wall elements, if present.

Aspect 19. The battery of aspect 18, wherein any of the exterior wall and/or interior wall elements comprises a material selected from any of composite, steel, aluminum and polycarbonate.

Aspect 20. The battery of aspect 19, wherein the battery is a battery pack comprising a plurality of individual battery cells, wherein the crosslinked intumescent layer is positioned to thermally insulate at least one of the individual battery cells from each other in the expanded and optionally charred state.

Aspect 21. The battery of any of the preceding aspects, wherein the battery is a lithium ion battery.

Aspect 22. An article comprising a battery, wherein a crosslinked intumescent layer as defined in any of aspects 1-17 is applied to a part of the article adjacent to the battery between the battery and the article.

Aspect 23. The article of aspect 22, wherein the battery is a battery as defined in any of aspects 1-21.

Aspect 24. The article of any of aspect 22 or 23, wherein the article is a vehicle comprising a lithium ion battery and a passenger cabin and the crosslinked intumescent layer is applied to at least a portion of the floor of the vehicle adjacent to the battery between the battery and the vehicle body.

Aspect 25. Use of the curable intumescent composition as defined in any of aspects 1-17 to provide fire protection for a battery and/or to reduce or prevent thermal runaway of a battery when applied to any part of the battery.

Aspect 26. Use of aspect 25, wherein the battery is a lithium ion battery.

Aspect 27. Use of the curable intumescent composition as defined in any of aspects 1-17 to provide fire protection for an article comprising a battery when applied to a part of the article adjacent to the battery between the battery and the article.

Aspect 28. Use of aspect 27, wherein the article is a vehicle comprising a lithium ion battery and a passenger cabin and the curable intumescent coating composition is used to protect the passenger cabin of the vehicle from a battery fire.

Aspect 29. A method to provide fire protection to a battery or to reduce or prevent thermal runaway of a battery by applying the curable intumescent composition as defined in any of aspects 1-17 to any part of the battery to form a coating thereon and curing the coating to obtain a crosslinked intumescent coating thereon.

Aspect 30. A method to provide fire protection to a battery or to reduce or prevent thermal runaway of a battery by forming the curable intumescent composition as defined in any of aspects 1-17 into an intumescent self-supported film or sheet and applying the intumescent self-supported film or sheet to a battery and curing the intumescent self-supported film or sheet prior to or after the application to the battery.

Aspect 31. The method of any of aspects 29 or 30, wherein the battery is a lithium ion battery.

Aspect 32. A method to provide fire protection for an article comprising a battery by applying the curable intumescent coating composition as defined in any of aspects 1-17 to a part of the article adjacent to the battery between the battery and the article to form a coating thereon and curing the coating to obtain a crosslinked intumescent coating thereon.

Aspect 33. A method to provide fire protection for an article comprising a battery by forming the curable intumescent composition as defined in any of aspects 1-17 into an intumescent self-supported film or sheet and applying the intumescent self-supported film or sheet to a part of the article adjacent to the battery between the battery and the article and curing the intumescent self-supported film or sheet prior to or after the application to the part of the article.

Aspect 34. The method of any of claim 33 or 34, wherein the article is a vehicle comprising a lithium ion battery and a passenger cabin and the crosslinked intumescent coating is positioned to protect the passenger cabin of the vehicle from a battery fire.

The following examples are intended to be illustrative of the invention and are not intended to be limiting.

EXAMPLES

Example 1

Pittchar® XP Component A, an epoxy based resin pack, and Pittchar® XP Component B, a cure pack containing a polyamine curing agent and melamine as gas source, both commercially available from PPG Industries Pittsburgh Pa. were mixed in an amount of 75 wt.-% and 25 wt.-%, respectively. The mixture was spray applied using a Graco Plural-component sprayer to a freshly sand-blasted steel panel (thickness=5 mm, size 15.24 cm×15.24 cm, SA 2.5) and allowed to cure at 23° C. for a minimum of seven days. The dry coating thickness of the cured coating was 5 mm.

On the back of the coated sample, a thermocouple was attached at the center point to monitor the temperature through the sample. The center of the coated panel was then positioned at a distance of 4 cm from a propane torch (diameter 3.5 cm, propane) with the crosslinked intumescent coating in the direction to the torch. The temperature of the flame was monitored through a second thermocouple placed close to the base of the flame and found to remain stable between 900-1000° C. The temperature at the back of the coated substrate and for comparison of an uncoated identical steel panel was measured for a prolonged period of time. The result is shown in FIG. 1.

Example 2

Example 1 was repeated, with the exception of the dimensions of the steel panel that was 25.4 cm×25.4 cm and that the coating composition was applied by hand brushing at various dry coating thicknesses of the cured coating of 1, 2 and 5 mm.

Figure 2:
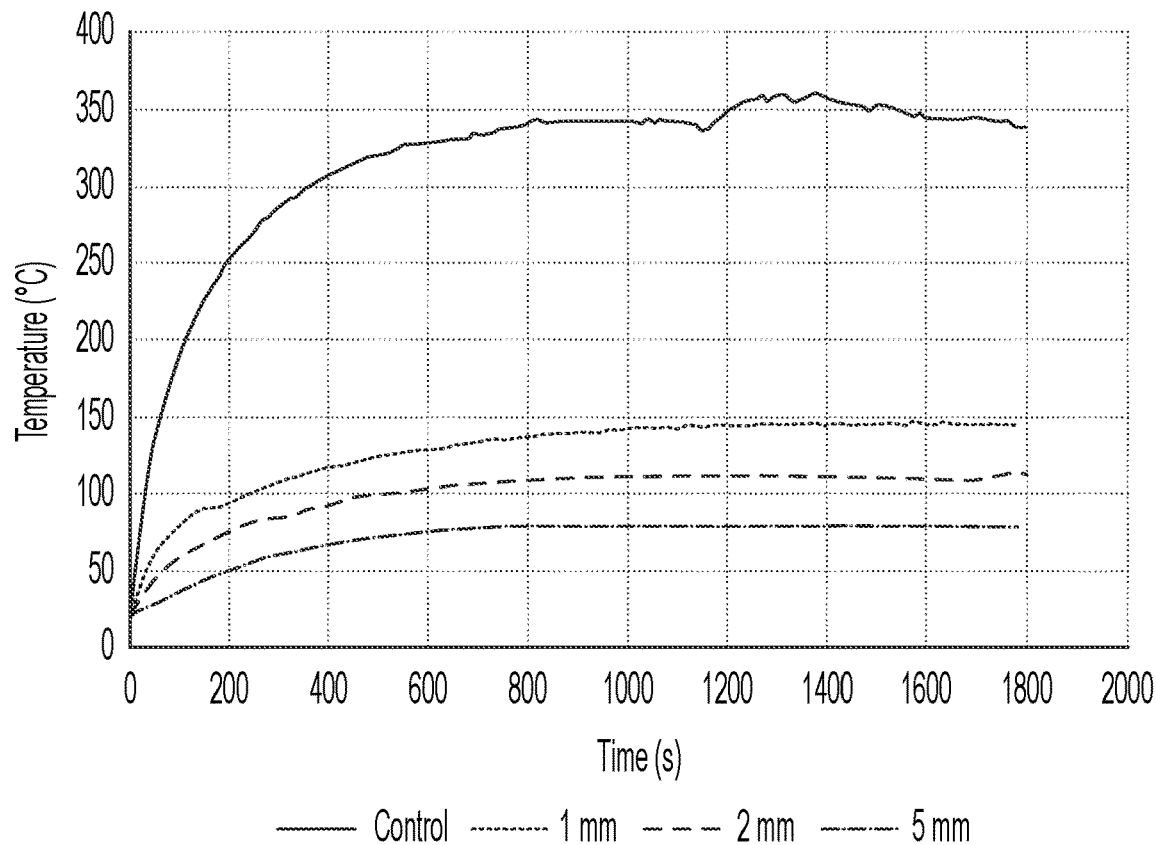
FIG. 2 graphically illustrates the temperature performance for 1 mm, 2 mm and 5 mm thick samples according to the present invention.

While a control sample without intumescent coating reached a maximum temperature of 360° C. in 30 min exposure to the flame, the temperature only increased to a maximum of 147° C. for the steel coated with 1 mm intumescent coating, 114° C. for a 2 mm coating and 80° C. for a 5 mm coating. The result shown in FIG. 2.

Example 3

Free films of the intumescent coating composition of example 1 (thickness=1.2 and 5 mm) were cast using rectangular molds (cut from polypropylene sheets) and allowed to cure for seven days at 23° C. After film release, a commercial adhesive film (3M 950 transfer tape) lined on one side was applied on the back of each film. The sample was cut to the steel panel size (15.24 cm×15.24 cm), after which the liner was released and the intumescent coating was pressed against the steel substrate (Steel panel: thickness 5 mm, size 15.24 cm×15.24 cm).

The flame test as in example 1 was repeated. While a control sample without intumescent coating reached a maximum temperature of 360° C. in 30 min exposure to the flame, the temperature only increased to a maximum of 102° C. for the steel coated with 1 mm intumescent coating, 107° C. for a 2 mm coating and 93° C. for a 5 mm coating.

Example 4

Example 1 was repeated, with the exception that the propane torch was replaced by burning liquid electrolyte that is typically used in lithium ion batteries (1.2M Li$^+$OH$^-$ in 3/7 w/w ethylene carbonate/methylethylcarbonate). The flame temperature was around 650° C.

The flame test as in example 1 was repeated. While a control sample without intumescent coating reached a maximum temperature of 142° C. in 30 min exposure to the flame, the temperature only increased to a maximum of 71° C. for the steel coated with 5 mm coating.

Figure 3:
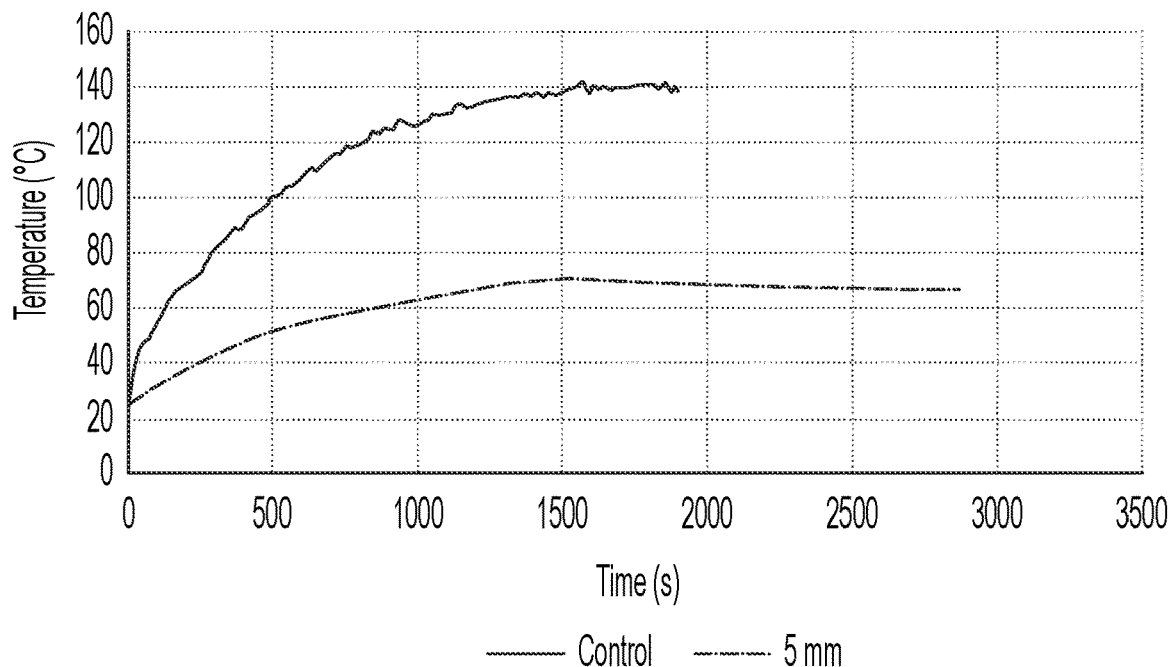
FIG. 3 graphically illustrates the temperature performance for a 5 mm thick sample according to the present invention.

The result is shown in FIG. 3

Example 5

Steelguard® 951 Component A, an epoxy based resin pack and melamine as gas source, and Steelguard® 951 Component B, a cure pack containing a polyamine curing agent, both commercially available from PPG Industries Pittsburgh Pa. were mixed in an amount of 45 wt.-% and 55 wt.-%, respectively. The mixture was spray applied using a Graco Plural-component sprayer to an aluminum panel (thickness=0.64 mm, size 7.5 cm×15.1 cm) and allowed to cure at 23° C. for a minimum of seven days. The dry coating thickness of the cured coating was 0.18 mm.

On the back of the coated sample, a thermocouple was attached at the center point to monitor the temperature through the sample. The back side of the panel was covered with thermal-isolation wools. The center of the coated panel was then positioned at a distance of 17 cm from a propane torch with the crosslinked intumescent coating in the direction to the torch. The temperature of the flame was monitored through a second thermocouple placed close to the base of the flame and found to remain stable between 850-1000° C. The temperature at the back of the coated substrate and for comparison of an uncoated identical aluminum panel was measured for 3 min.

Figure 4:
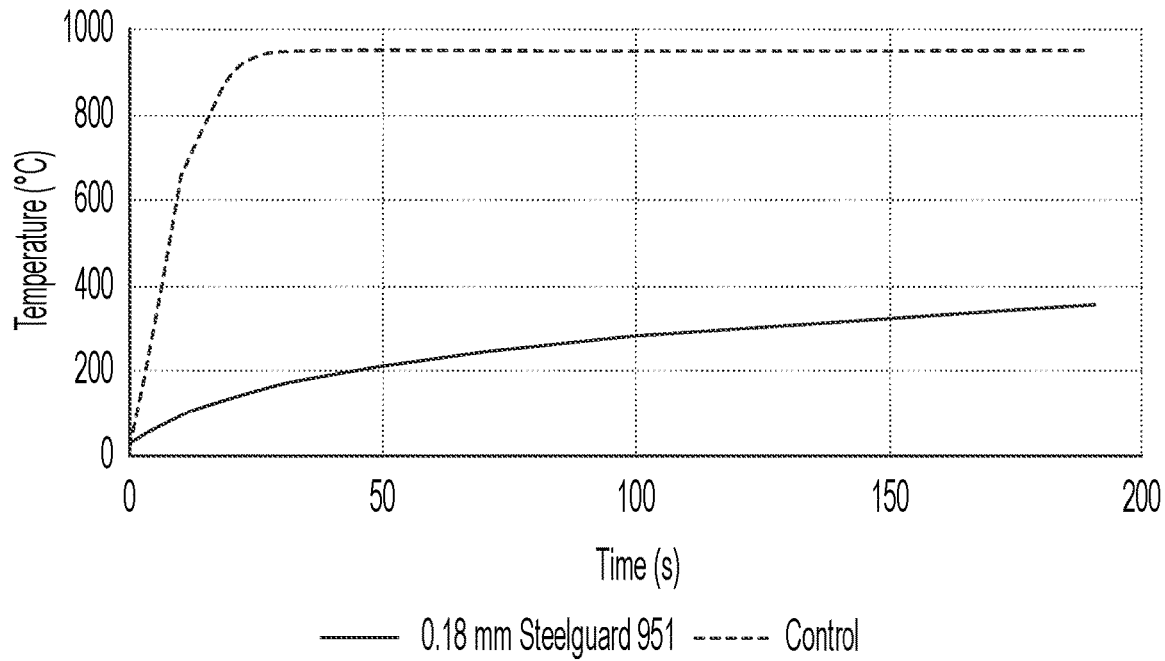
FIG. 4 graphically illustrates the temperature performance for a 0.18 mm thick sample according to the present invention.

The result is shown in FIG. 4.

Example 6

Example 5 was repeated, with the exception of a steel panel having the following dimensions was used (thickness=5 mm, size 25 cm×25 cm). The coating composition was applied to the steel panel by hand brushing and allowed to dry 23° C. for a minimum of seven days. Various dry coating thicknesses (1, 2 and 6 mm) of the cured coating were observed.

While a control sample without intumescent film reached a maximum temperature of 360° C. in 30 min exposure to the flame, the temperature only increased to a maximum of 209° C. for the steel coated with 1 mm 2K CPFP film, 160° C. for a 2 mm film and 117° C. for a 6 mm film.

Figure 5:
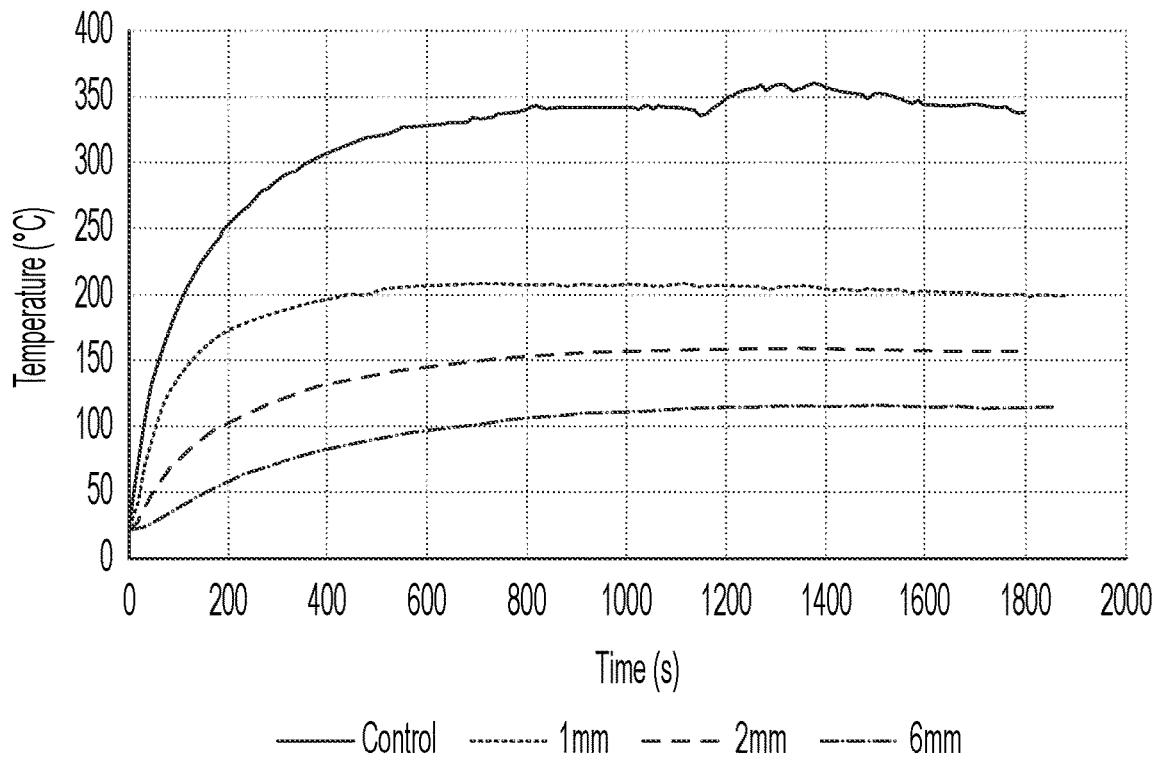
FIG. 5 graphically illustrates the temperature performance for 1 mm, 2 mm and 6 mm thick samples according to the present invention.

The result is shown in FIG. 5.

The invention claimed is:

1. A battery comprising structural elements and a crosslinked intumescent layer comprising a coating and/or a self-supported film or sheet, wherein the coating and/or self-supported film or sheet is applied to at least a portion of a structural element, wherein the crosslinked intumescent layer is formed from a curable intumescent composition comprising:
   (a) a resin component comprising one or more oligomeric or polymeric compounds having a plurality of functional groups;
   (b) a curing agent having a plurality of functional groups that are reactive with the functional groups of the oligomeric or polymeric compound of resin component (a); and
   (c) a compound providing an expansion gas upon thermal decomposition; wherein compounds (a) to (c) differ from each other.

2. The battery of claim 1, wherein the resin component (a) comprises one or more epoxy resins, polysiloxane resins, acrylic resins, polyurethane resins, polyurea resins, polyvinyl resins, phenolic resins, urea formaldehyde resins, polyimide resins, melamine resins, polyester resins and cyanate resins.

3. The battery of claim 1, wherein the functional groups of the resin component (a) are selected from epoxy, amine, vinyl, amide, carbamate, urea, mercaptan, carboxylic acid, (meth)acryloyl, isocyanate, alkoxysilyl, anhydride, hydroxyl, alkoxy groups, functional groups that are capable of reacting with each other and combinations thereof.

4. The battery of claim 3, wherein the functional groups that are capable of reacting with each other are selected from N-methylolamide groups; silane groups having silicon bonded hydrolysable or condensable groups; ethylenically unsaturated fatty acid groups; azomethine groups; azetidine groups; groups capable of thermally reversible Diels-Alder reaction.

5. The battery of claim 1, wherein the resin compound (a) comprises an epoxy resin and the curing agent (b) is mandatory and comprises
   a polyamine-functional compound that may be selected from an aliphatic polyamine, an aromatic polyamine, poly(amine-amides) polyetheramines and combinations thereof or
   a polythiol-functional compound that may be selected from polysulfide thiols, polyether thiols, polyester thiols, pentaerythritol based thiols and combinations thereof or
   combinations thereof.

6. The battery of claim 1, wherein the compound providing an expansion gas upon thermal decomposition (c) is selected from melamine, ammonium salts of phosphoric acid, guanidine, methylolated melamine, hexamethoxymethyl melamine, urea, dimethylurea, melamine pyrophosphate, dicyandiamide, guanylurea phosphate, glycine, calcium carbonate, magnesium carbonate, calcium hydroxide, magnesium dihydroxide, aluminum trihydroxide, boric acid and boric acid esters.

7. The battery of claim 1, further comprising additives (d) comprising a combination of a phosphorous source, a boron source, a zinc source, an acid source and optionally a carbon source, whereby a single material may be a source of two or more of the defined elements.

8. The battery of claim 1, optionally further comprising a phosphorous source, a boron source, a zinc source, and/or an acid source, wherein
   the total amount of resin component (a) is 10 to 40 wt.-%, based on the total solids weight of the composition;
   the total amount of curing agent (b) is 10 to 30 wt.-%, based on the total solids weight of the composition;
   the total weight of the compound providing an expansion gas upon thermal decomposition (c) is 0.1 to 25 wt.-% based on the total solids weight of the composition;
   the total amount of phosphorous source, if present, is 0.05 to 20 wt.-%, based on the total solid weight of the composition;
   the total amount of zinc source, if present, is 0.1 to 25 wt.-%, based on the total solid weight of the composition;
   the total amount of boron source, if present, is 0.1 to 10 wt.-%, based on the total solid weight of the composition;
   the total amount of acid source, if present, is 5 to 30 wt.-%, based on the total solids weight of the composition.

9. The battery of claim 1, wherein the structural elements comprise exterior wall elements defining a housing and optionally interior wall elements, wherein the crosslinked intumescent layer is at least partially applied to the external and/or internal side of any of the exterior wall elements and/or to any side of any of the interior wall elements, if present.

10. The battery of claim 1, wherein the battery is a lithium ion battery.

11. An article comprising a battery, wherein the crosslinked intumescent layer of claim 1 is applied to a part of the article between the battery and the article.

12. A method for making the battery of claim 1 by
   applying the curable intumescent composition to at least a portion of any structural element to form a coating thereon and curing the coating to obtain a crosslinked intumescent layer thereon; and/or
   forming the curable intumescent composition into a self-supported film or sheet and applying the self-supported film or sheet to at least a portion of any structural element.

13. The article of claim 11, wherein the article is a vehicle comprising a lithium ion battery, a floor, and a passenger cabin and the crosslinked intumescent coating is positioned between the passenger cabin and the battery and/or between the floor and the battery.

* * * * *